INVENTORS
BY OLIVER K. KELLEY
GILBERT K. HAUSE
Craig V. Monton
ATTORNEY

United States Patent Office 2,832,429
Patented Apr. 29, 1958

2,832,429

FRICTION BRAKE COOLING SYSTEM

Oliver K. Kelley, Bloomfield Hills, and Gilbert K. Hause, Franklin, Mich., assignors to General Motors Corporation, Detroit, Mich., a corporation of Delaware Application December 19, 1955, Serial No. 553,890

14 Claims. (Cl. 180—54)

This invention relates to a system for circulating a cooling fluid through friction brakes of a motor vehicle.

The motor vehicle is adapted to be provided with a friction brake through which a liquid is circulated by means of a pump to provide for forced cooling of the brake during actuation of the brake, thereby to remove heat of friction created by the braking action. The liquid that is circulated through the brake is received by the pump from a suitable source of cooling fluid, the pump delivering the cool fluid under pressure into the brake for circulation therethrough, whereby to pick up the heat of friction created within the brake. The liquid that is circulated through the brake by the pump is then delivered to a heat exchange apparatus in which the now heated fluid is cooled for subsequent return to the pump and circulation through the brake.

On many of the currently manufactured vehicles there is provided a hydrokinetic torque transfer mechanism by which the driving energy from an engine on the motor vehicle is transmitted to the drive wheels of the vehicle. These hydrokinetic torque transfer mechanisms are known under many names such as torque convertors, fluid drives, hydraulic couplings and others but primarily comprise a mechanism in which a body of oil is circulated between an impeller driven by the engine of the vehicle and a rotor that is connected with the drive shaft of the vehicle whereby the kinetic energy of the oil circulated within a torous by action of the impeller causes the rotor to follow the rotation of the impeller and thereby drive the vehicle. In such mechanisms there is provided a liquid circulating system by which liquid is circulated through the hydrokinetic transfer mechanism and directed to a heat exchange device for the purpose of cooling the liquid and thereby maintaining the liquid within the hydrokinetic transfer mechanism to a relatively low temperature, and prevent overheating of the liquid within the mechanism which would result in the event of a high degree of slip between the impeller and the rotor.

It is an object of the invention to provide a system for liquid cooling of the friction brakes on a motor vehicle that also has a hydrokinetic torque transfer mechanism for driving the vehicle that includes a circulatory system for cooling liquid that is circulated through the torque transfer mechanism wherein the liquid cooling circulatory system for the friction brakes and the liquid circulatory system for the torque transfer mechanism are interconnected to provide for a limited fluid circulation between the circulatory system for the torque transfer mechanism and the circulatory system for the friction brakes during all periods of inactivity of the friction brakes, but wherein suitable controls are provided in the conduits interconnecting the two systems by which the two systems are rendered independent for fluid circulation therein during periods of activity of the brakes.

During the periods of braking action, a large quantity of heat is created in the brakes that is largely dissipated in the heat exchange device of the fluid circulatory cooling system for the brakes. However, immediately following a brake application, there is a certain amount of residual heat in the braking mechanism which should be removed before another brake application occurs. It is therefore another object of this invention to provide a larger volume of fluid circulation from the cooling circulatory system for the hydrokinetic torque transfer mechanism into the cooling circulatory system for the brakes immediately following a period of activity of the brakes so that the residual heat in the brakes can be removed by the interchange of fluid between the two systems with the heat exchange device in the circulatory system for the hydrokinetic torque transfer mechanism providing for removal of heat from the fluid circulating in interchange between the two systems, the pumps in the brake system at this time being inactive to cause any substantial circulation of fluid in the brake cooling circulatory system.

It is another object of the invention to provide a system in accordance with the foregoing object wherein the increased flow of fluid from the circulatory system for the torque transfer mechanism into the circulatory system for the brakes is obtained directly from one of the pumps adapted to supply fluid under pressure into the circulatory system of the hydrokinetic torque transfer mechanism, a suitable control being provided that is responsive to the temperature of fluid returning from the circulatory system for the brake to open a conduit connecting the discharge side of the aforesaid pumps with a supply conduit of the circulatory system for the brakes to provide for the increased circulation of fluid so long as the temperature of the fluid returning from the brake cooling system is above a predetermined value.

Further objects and advantages of the present invention will be apparent from the following description, reference being had to the accompanying drawings wherein a preferred form of the invention is clearly shown.

Figure 1:
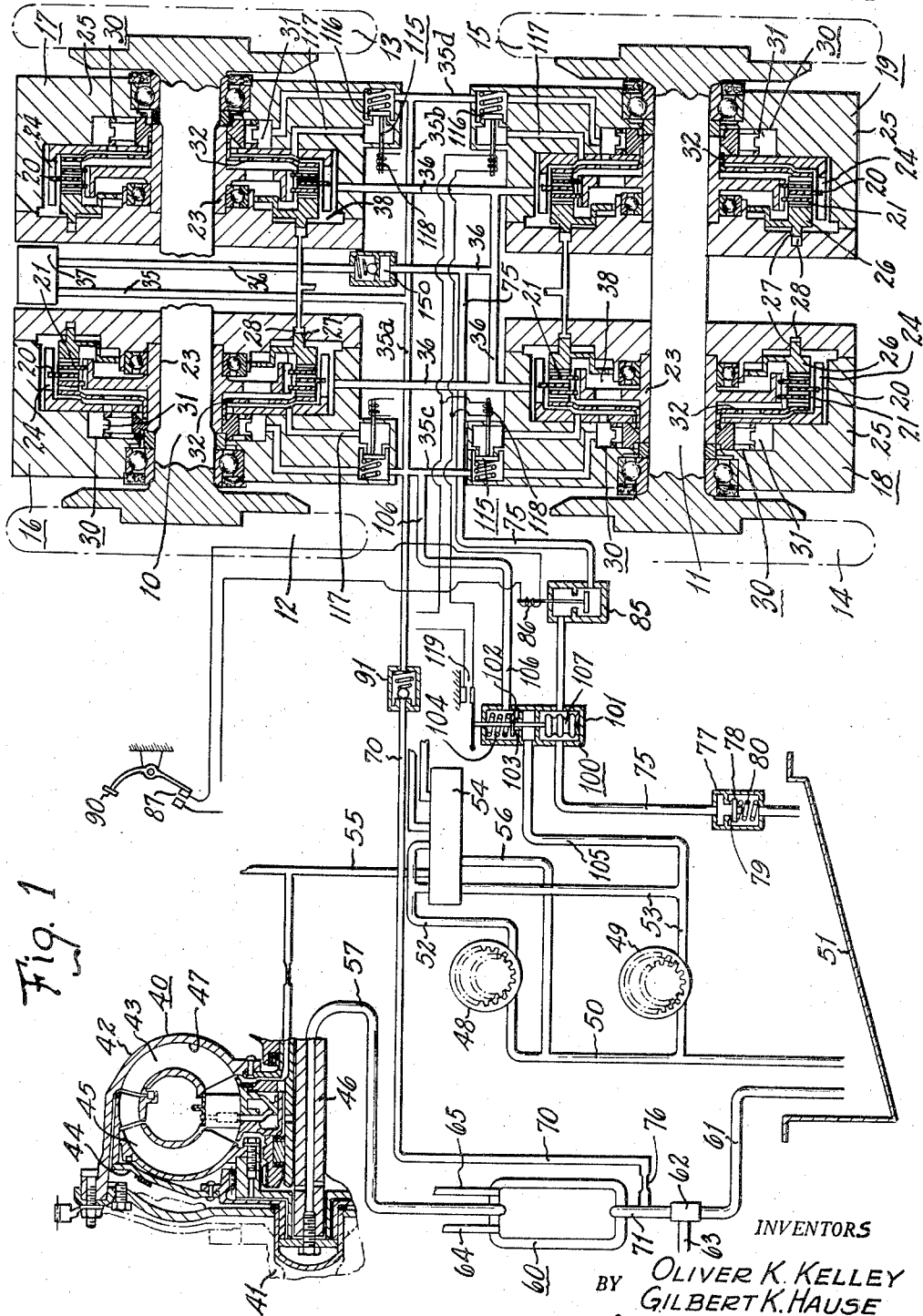
Figure 1 is a schematic illustration of a brake cooling system incorporating features of this invention.
Figure 2:
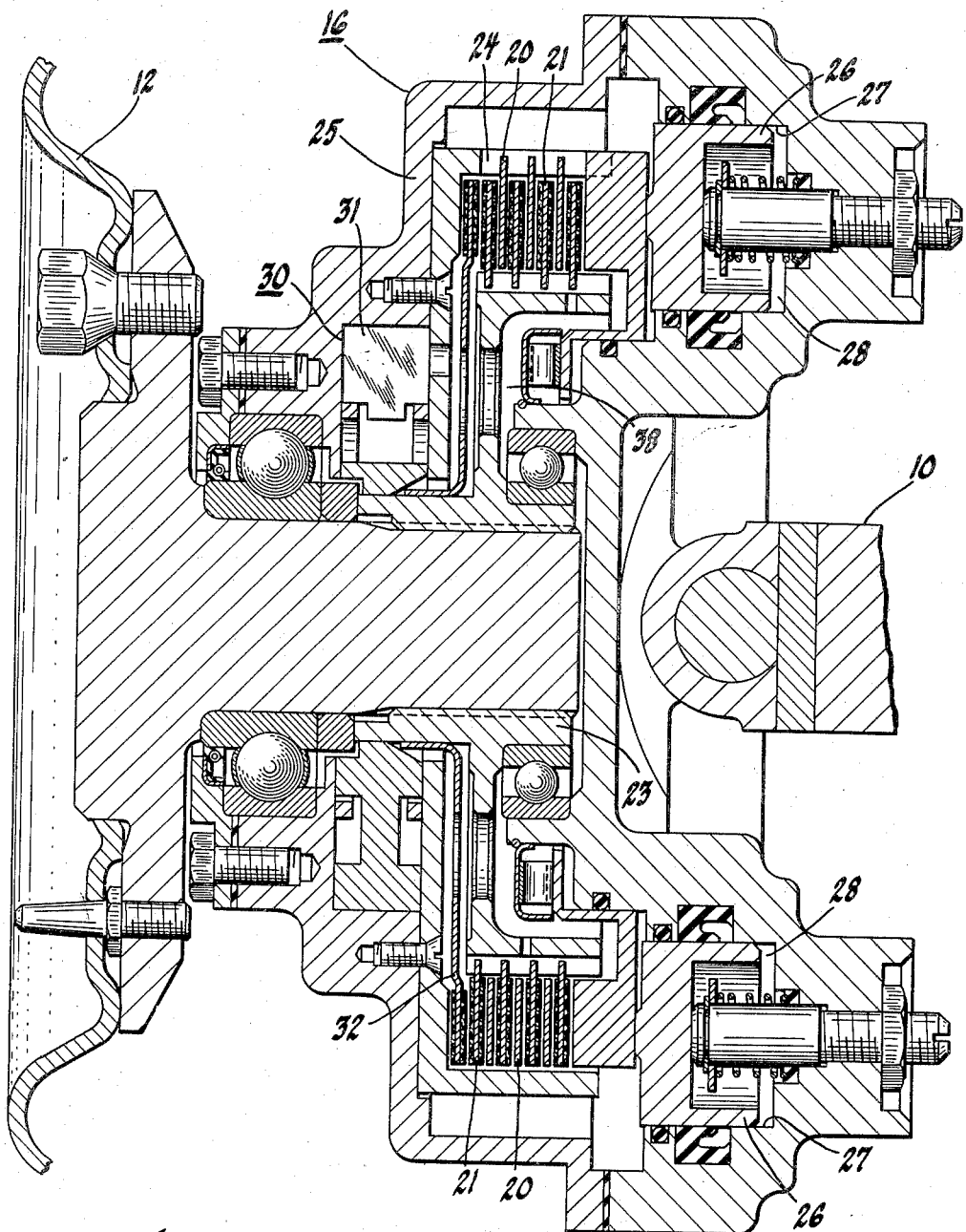
Figure 2 is a transverse cross sectional view illustrating one of the brakes shown schematically in Fig. 1.

In the drawings there is illustrated a schematic system arrangement adapted for use on a motor vehicle wherein a circulatory liquid cooling system for the brakes of the motor vehicle is interconnected with a fluid circulatory system for a hydrokinetic torque transfer mechanism to provide for the use of a common fluid in the two systems, suitable controls being provided between the two systems to provide for a limited circulation of liquid between the systems continuously during periods of inactivity of the brakes and which effect complete independence of fluid circulation of the liquids in the two systems whenever a braking action is occasioned but which allow the limited liquid flow between the systems to be re-established as soon as a braking action is terminated. When the braking action is terminated and the limited flow of liquid between the systems is re-established the temperature of the interchanging fluid is effective upon a control mechanism to cause an increased flow of fluid between the systems immediately following a braking action if the temperature of the fluid returning from the circulatory system for the brakes to the circulatory system for the hydrokinetic torque transfer mechanism is above a predetermined value, whereby to effect cooling of the brakes during a period of inactivity following a period of activity. In the latter circumstance, the heat exchange device in the circulatory system for the hydrokinetic torque transfer mechanism is that which removes the heat picked up in the brakes by the circulating fluid.

The motor vehicle may consist of a pair of axles 10 and 11 supporting the usual wheels 12 and 13 on the axle 10 and the wheels 14 and 15 on the axle 11. The wheels 12 and 13 are provided with friction brakes 16 and 17 respectively while the wheels 14 and 15 are provided with friction brakes 18 and 19 respectively. The friction brakes 16, 17, 18 and 19 may be of the type more fully disclosed and described in our copending application S. N. 504,528 filed April 28, 1955. The friction brakes each include a plurality of stationary disks 20 and rotatable disks 21 that provide a disk stack or assemblage 20 to effect braking of the wheel with which the brake is associated. The rotatable disks 21 are carried upon a hub 23 that is secured to the axle 10 or 11 respectively. The stationary disks 20 are carried upon a spline connection 24 secured to the brake housing 25 whereby the disks 20 are retained stationary relative to the rotating disks 21.

A piston 26 is slidably disposed in a cylinder 27 thereby providing an hydraulic chamber 28 that receives hydraulic fluid from the master cylinder of a brake actuating system (not shown), the master cylinder being adapted for operation by a conventional brake pedal provided in the passenger compartment of a motor vehicle.

Each of the brakes 16, 17, 18 and 19 may be provided with a fluid pump of the vane type 30. The vanes 31 of the pump 30 are connected with a driven disk 32 that is normally stationary, but which is caused to rotate by engagement with the rotatable disks 21 when the brake is actuated. Rotation of the disk 32 effects rotation of the vanes 31 of the pump to cause the pump to circulate liquid through the respective brakes.

The pumps 30 for each of the wheel brakes 16, 17, 18 and 19 receive liquid through the supply conduit 35 connected with the outlet side of a heat exchange device 37 and the branch conduits 35a, 35b, 35c and 35d and discharge liquid under pressure within the pressure chamber 38 of the brake housing 25 for circulation between the rotatable and stationary brake disks 20, 21 to effect cooling of the disks when they are effecting a brake operation, as more specifically disclosed and described in the heretofore mentioned application, S. N. 504,528.

The liquid circulated through the disk assemblage 20, 21 is exhausted into the discharge lines 36 for return circulation to the heat exchange device 37 for cooling that it might be returned to the brakes in a cool condition.

The liquid circulatory system for the friction brakes 16, 17, 18 and 19 is connected with the fluid circulatory system for a hydrokinetic torque transfer mechanism 40 that is adapted to transfer the engine torque to the drive shaft for the motor vehicle in a manner hereinafter described. The torque transfer mechanism is connected with the engine flywheel through a shaft connection 41, the flywheel connection 41 being connected with the impeller 42 that is provided with a plurality of arcuate vanes 43 internally thereof. A rotor or runner 44 is provided with a plurality of arcuate vanes 45 similar to the vanes 43, the runner 44 and the impeller 42 forming a torous internally thereof in which oil is forceably driven from the impeller 42 into the runner 44 to drive the runner. The runner 44 is suitably secured to an output shaft 46 for delivering the engine torque to the wheels of the vehicle.

The torous cavity 47 provided between the impeller 42 and the runner 44 is supplied with oil under pressure by means of two pumps 48 and 49, the pump 48 being drivingly connected with the engine shaft for rotation whenever the engine is operating and the pump 49 is connected with the output shaft 46 so as to effect operation of the pump whenever the rear wheels of the motor vehicle rotate. The two pumps 48 and 49 are connected in parallel with their suction supply line 50 being connected with an oil sump or reservoir 51. The high pressure discharge lines 52 and 53 from the pumps 48 and 49 deliver the output of the pumps into a pressure regulating valve 54 that regulates the pressure of the oil delivered into the torous cavity 47 of the torque transfer mechanism by way of the supply line 55. Fluid in excess of that required to maintain a pressure of predetermined value in the torque convertor supply line 55 is by-passed to the suction side of the pumps 48 and 49 by way of a by-pass line 56.

The oil delivered into the torous cavity 47 of the torque transfer mechanism is exhausted through the discharge line 57 for return to a heat exchange device 60 in which the oil is cooled and then returned to the oil reservoir or sump 51 by way of the return line 61. A pressure regulating valve 62 is provided in the conduit 61 between the oil cooler 60 and the sump or reservoir 51 by which oil under pressure is delivered through the line 63 to the torque transfer mechanism for lubrication of certain parts and bearings thereof.

The heat transfer mechanism 60 is provided with a supply line 64 and a discharge line 65 by which coolant is circulated through the heat exchange device for cooling the oil passing through the device. Preferably the coolant is water which is adapted to be circulated from the radiator of the motor vehicle. This is also true of the heat exchange 37, but both of the devices could be air cooled.

The liquid circulatory system for the friction brakes 16, 17, 18 and 19 heretofore described and the liquid circulatory system for the hydrokinetic torque transfer mechanism just described are interconnected by a conduit 70 that connects the outlet line 71 of the heat exchange device 60 with the supply line 35 of the cooling system for the brakes. A second conduit 75 connects the exhaust line 36 of the cooling system for the brakes with the reservoir or sump 51 that is the liquid supply source for the circulatory system for the torque transfer mechanism 40. A check valve 150 is in line 36 to prevent short circuiting of the cooling fluid from the line 70 through the return line 75 at a time when valve 85 is open to insure positive limited fluid flow through the brakes when the pumps 30 are not operating.

The conduit 70 has a control means 76 in the form of a restriction that limits flow of fluid under pressure from the outlet line 71 of the heat exchange device 60 into the supply line 35 of the cooling system for the brakes. The return line 75 is provided with a valve 77 that maintains a pressure of relatively low value in the conduit 70, 75 and the conduits 35 and 36 of the cooling system for the brakes, whereby the pumps 30 of the brakes are always maintained in a primed condition.

The valve 77 includes a valve member 78 held on its seat 79 by means of a spring 80, and is adapted to open when the pressure in the conduit 75 reaches a value of about 8–10 pounds.

So long as the friction brakes 16, 17, 18 and 19 are inactive, the pumps 30 are inactive and therefore there is substantially no positive circulation in the circulatory system for the brakes occasioned by the pumps. At this time the fluid under pressure being delivered through the conduit 70 will cause a minimum volume of fluid circulation through the cooling system for the brakes to avoid stagnation of liquid and any possible overheating, as well as maintain pressure on the pumps to keep them primed.

A control valve 85 is provided in the conduit 75 between the valve 77 and the exhaust line 36 of the brake cooling system. Normally this valve is in the open position, as shown, to allow for the limited circulation of fluid through the brake cooling system from the circulatory system for the torque transfer mechanism as heretofore described.

However, when a braking application is required, and the brake pedal 90 is actuated by the operator to deliver fluid from the master cylinder (not shown) into the cylinder chambers 28 of the brakes to actuate the brake disks 20, 21, the valve 85 is operated by the electric solenoid 86 and control of the switch 87 to close the valve, thereby preventing any flow of fluid through the conduit 75 out of the cooling system for the brakes. The check valve 91 in the conduit 70 prevents any flow of fluid from the conduit 35 of the brake cooling system.

Thus, when the friction brakes 16, 17, 18 and 19 are applied, the pumps 30 of the brakes will be driven by the disks 32 in the manner heretofore described. The pumps 30 will deliver fluid under pressure into the pressure chambers 38 of the brakes for circulation between the brake disks 20, 21 to pick up heat of friction created by the brake disks. The heated fluid will be exhausted into the lines 36 for delivery into the heat exchange device 37 for cooling, the cooled fluid returning through the pumps to the supply line 35. At this time the cooling system for the friction brakes is completely independent of the fluid circulatory system for the hydrokinetic torque transfer mechanism 40 and will remain so as long as a brake application is in progress.

However, when the brake pedal 90 is released, the switch 87 will be opened and the valve 85 will be allowed to open to reestablish circulatory connection between the cooling system for the brakes and the cooling system for the torque transfer mechanism 40 through the conduits 70 and 75 in the manner heretofore described, and thereby reestablish the limited fluid circulation from the cooling system for the torque transfer mechanism 40 through the cooling system for the brakes 16, 17, 18 and 19.

Under certain conditions of long braking applications, or repeated braking applications with only intermittent brake release, the build-up of heat in the brakes is such that when the brakes are released and the pumps 30 stop circulation of cooling fluid through the brake cooling system, the brake cooling fluid is not to a sufficiently low temperature as is desirable for the beginning of another brake application. Under this circumstance it is desirable to provide for cooling of the brake cooling fluid during a period of inactivity of the brake immediately following a brake application, and remove the residual heat that has built up in the mechanical elements of the brake. For this purpose a control valve 100 is provided.

The control valve 100 comprises a valve body 101 having a valve element 102 carried upon a seat 103 and held on the seat by the compression spring 104. The valve body 101 is connected by a conduit 105 with the high pressure outlet line 53 of the pump 49. The valve body 101 is also connected by a conduit 106 with the supply line 35 of the fluid circulatory system for the friction brakes, the conduits 105 and 106 being separated by the valve 102 which is normally held in closed position as illustrated.

The valve element 102 is connected with a thermally actuated device 107 that is placed in the return conduit 75 from the exhaust line 36 of the brake cooling system.

After a braking application has terminated, and limited flow circulation is reestablished between the cooling system for the hydrokinetic torque transfer mechanism and the cooling system for the friction brakes in the manner heretofore described, the fluid returning to the sump 51 through the return line 75 will be effective upon the thermal element 107 to operate the valve 100. If the temperature of the fluid returning to the sump 51 from the exhaust line 36 of the cooling system for the brakes is below a predetermined temperature, the valve 100 will remain closed as shown, and the fluid circulating system will be reestablished in the manner heretofore described.

However, if the temperature of the fluid exhausting from the line 36 of the brake cooling system is above a predetermined value, the thermal element 107 will cause the valve 102 to open and allow fluid under pressure to be delivered by the pump 49 from the line 53 into the line 105 and thence through the line 106 into the supply line 35 for the cooling system for the brakes. This increased flow of fluid will be taken by the pump 49 directly from the sump or reservoir 51 that maintains a substantially large volume of cooled fluid ready for use in either of the cooling systems since the reservoir 51 receives its fluid directly from the heat exchange device 60 in the cooling system for the torque transfer mechanism. This additional flow of fluid will quickly remove any residual heat in the friction brakes 16, 17, 18 and 19 and reduce the temperature of the fluid in the brake cooling system. Since the heat exchange device 37 is in circuit in the cooling system for the brakes, the increased volume of fluid delivered into the brake cooling system will also effect a positive circulation through the heat exchange device 37 and thereby aid in removal of heat from the circulating fluid.

Since the pumps 30 are not active during a period of inactivity of the brakes, it is desirable that the increased flow of fluid supplied into the brake cooling system by the pump 49 by-pass the pumps 30 rather than be placed under a high degree of restriction in attempting to flow through the pumps. Thus each of the branch supply lines 35a, 35b, 35c and 35d is provided with a control valve 115 that is adapted to open to by-pass the pump 30 when the valve 100 is opened. The valve 115 has the valve element 116 which when opened off its seat interconnects the supply lines 35a, 35b, 35c and 35d respectively with a by-pass conduit 117 that by-passes the pump 30. The valve element 116 is electrically operated by the solenoid 118 that is energized by a switch 119 operated by the valve 100 when it opens, closing of switch 119 energizing the solenoid 118 to open the valve element 116 off its seat concurrently with opening of valve element 102 off its seat. The arrangement is such as to provide a substantially unrestricted volume of fluid through the respective friction brakes by one of the pumps 49 in the circulating system for the torque transfer mechanism.

While the form of embodiment of the invention as herein disclosed constitutes a preferred form, it is to be understood that other forms might be adopted as may come within the scope of the claims which follow.

What is claimed is as follows:

1. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means and other heat exchange means in a second circulatory system including said brake means providing circulation of liquid through the brake means for cooling thereof, conduit means connecting the first mentioned system with said second mentioned system to provide for fluid exchange between the said systems, and control means in the said conduit means rendering the said systems independent during active brake application of said brake means.

2. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means and other heat exchange means in a second circulatory system including said brake means providing circulation of liquid through the brake means for cooling thereof, conduit means connecting the first mentioned system with said second mentioned system to provide for fluid exchange between the said systems, and control means in said conduit means providing limited flow of fluid from the first system for circulation through the second system during periods of inactivity of the brake means.

3. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means and other heat exchange means in a second circulatory system including said brake means providing circulation of liquid through the brake means for cooling thereof, conduit means connecting the first mentioned system with said second mentioned system to provide for fluid exchange between the said systems, control means in said conduit means providing limited flow of fluid from the first system for circulation through the second system during periods of inactivity of the brake means, and other control means in the said conduit means rendering the systems independent during active brake application of said brake means.

4. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means and other heat exchange means in a second circulatory system including said brake means providing circulation of liquid through the brake means for cooling thereof, conduit means connecting the first mentioned system with said second mentioned system to provide for fluid exchange between the said systems, control means in said conduit means providing limited flow of fluid from the first system for circulation through the second sysem during periods of inactivity of the brake means, and other control means in said conduit means opened in response to temperature rise of the liquid in said second system to provide for delivery of liquid from the first system to the second system directly from the pump means of the first system.

5. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means and other heat exchange means in a second circulatory system including said brake means providing circulation of liquid through the brake means for cooling thereof, conduit means connecting the first mentioned system with said second mentioned system to provide for fluid exchange between the said systems, control means in said conduit means providing limited flow of fluid from the first system for circulation through the second system during periods of inactivity of the brake means, and other control means in said conduit means open in response to temperature of the liquid returning from the second system to the first system to provide for delivery of liquid from the first system to the second system directly from the pump means of the first system.

6. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means rendered active concurrently with activation of the brake means and other heat exchange means in a second circulatory system including said brake means providing circulation of liquid through the brake means by the said other pump means during activation of the brakes for cooling thereof, conduit means connecting the first mentioned system with said second mentioned system to provide for fluid exchange between the said systems during inactivity of the said brake means, and control means in the said conduit means rendering the said systems independent during active brake application of said brake means.

7. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means rendered active concurrently with activation of the brake means and other heat exchange means in a second circulatory system including said brake means providing circulation of liquid through the brake means by the said other pump means during activation of the brakes for cooling thereof, conduit means connecting the first mentioned system with said second mentioned system to provide for fluid exchange between the said systems during inactivity of the said brake means, control means in the said conduit means limiting liquid flow from the first system into the second system during the inactivity of the brakes, and other control means in the said conduit means rendering the said systems independent during active brake application of said brake means.

8. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means in the said brake means and other heat exchange means forming a second circulatory system that includes said brake means and provides for circulation of liquid from the brake pump means directly through the brake means for cooling thereof, means driving said other pump means only with brake activation of said brake means to effect pump circulation of liquid through said second system only during the brake actuation, conduit means connecting the first mentioned system with said second mentioned system to provide for fluid exchange between the said systems, control means in said conduit means providing for limited flow of fluid from the first system to the second system during inactivity of the brake means, other control means actuated by temperature rise of fluid from the second system to the first providing for increased fluid circulation from the first system to the second system during inactivity of the brake means, a third control means rendered active to bypass the said increased flow around the pump means of said second system on actuation of said other control means, and control means in the said conduit means rendering the said systems completely independent during active brake application of said brake means.

9. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means and other heat exchange means in a second circulatory system including said brake means providing circulation of liquid through the brake means for cooling thereof, conduit means connecting the first mentioned system with said second mentioned system to provide for fluid exchange between the said systems, control means in said conduit means providing limited flow of fluid from the first system for circulation through the second system during periods of inactivity of the brake means, a second control means in the said conduit means rendering the said systems independent during active brake application of said brake means, and a third control means in said conduit means responsive to the temperature of the fluid in interchange between the said systems to provide for an increase in fluid interchange from the first system into the second system.

10. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a circulatory system providing circulation of liquid through said mechanism including pump means effecting liquid circulation in the system and a heat exchange device through which the circulating liquid is directed for cooling, other pump means and other heat exchange means in a second circulatory system including said brake means providing circulation of liquid through the brake means for cooling thereof, conduit means connecting the first mentioned system with said second mentioned system to provide for fluid exchange between the said systems, control means in said conduit means providing limited flow of fluid from the first system for circulation through the second system during periods of inactivity of the brake means, a second control means in the said conduit means rendering the said systems independent during active brake application of said brake means, and a third control means in said conduit means responsive to the temperature of the fluid in interchange between the said systems to provide for an increase in fluid interchange from the first system into the second system on an increase of temperature of the interchange fluid returning from the second system to the first system during periods of inactivity of the brake means.

11. In a system for liquid cooling of friction brakes on a motor vehicle, the combination of, frictional wheel brake means arranged for circulation of cooling fluid through the brake means, a hydrokinetic torque transfer mechanism for effecting transfer of driving energy from the engine of a vehicle to the drive wheels and including a fluid circulatory system providing circulation of liquid through said mechanism including pump means effecting liquid circulation in the system and a heat exchange device through which a circulating liquid is directed for cooling, second pump means in the brake means and drivingly actuated concurrently with actuation of the brake means to effect circulation of cooling fluid through the brake means during actuation thereof, a heat exchange device, means providing a circulatory system between the second pump and brake means and the last mentioned heat exchange device, said last mentioned circulatory system including a supply conduit supplying cooled fluid from the last mentioned heat exchange device to the second pump and brake means for circulation therethrough and an exhaust conduit for delivering heated fluid from the said brake means to the last mentioned heat exchange device, conduit means connecting the outlet of the first mentioned heat exchange device of the first system with the supply conduit of the second system for delivery of fluid under pressure from the first system into the second system, a second conduit means connecting the exhaust conduit of the second system with a liquid supply source of the first system, said first and second conduit means providing for interchange of fluid between the first and second systems, and control means in said first and second conduit means effective concurrently with actuation of the brake means to render the second system completely independent of the first system.

12. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a fluid circulatory system providing circulation of liquid through said mechanism including pump means effecting liquid circulation in the system and a heat exchange device through which a circulating liquid is directed for cooling, second pump means in the brake means and drivingly actuated concurrently with actuation of the brake means to effect circulation of cooling fluid through the brake means during actuation thereof, a heat exchange device, means providing a circulatory system between the second pump and brake means and the last mentioned heat exchange device, said last mentioned circulatory system including a supply conduit supplying cooled fluid from the last mentioned heat exchange device to the second pump and brake means for circulation therethrough and an exhaust conduit for delivering heated fluid from the said brake means to the last mentioned heat exchange device, conduit means connecting the outlet of the first mentioned heat exchange device of the first system with the supply conduit of the second system for delivery of fluid under pressure from the first system into the second system, a second conduit means connecting the exhaust conduit of the second system with a liquid supply source of the first system, control means in said first conduit means providing for limited flow of liquid from said first system into said supply conduit of said second system for circulation through said brake means during inactivity of the brake means, and valve means in said first and second conduit means rendered active concurrently with actuation of the brake means to render said second system completely independent of the first system for circulation of fluid by the pump means in the brakes solely within said second system during actuation of the brakes.

13. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a fluid circulatory system providing circulation of liquid through said mechanism including pump means effecting liquid circulation in the system and a heat exchange device through which a circulating liquid is directed for cooling, second pump means in the brake means and drivingly actuated concurrently with actuation of the brake means to effect circulation of cooling fluid through the brake means during actuation thereof, a heat exchange device, means providing a circulatory system between the second pump and brake means and the last mentioned heat exchange device, said last mentioned circulatory system including a supply conduit supplying cooled fluid from the last mentioned heat exchange device to the second pump and brake means for circulation therethrough and an exhaust conduit for delivering heated fluid from the said brake means to the last mentioned heat exchange device, conduit means connecting the outlet of the first mentioned heat exchange device of the first system with the supply conduit of the second system for delivery of fluid under pressure from the first system into the second system, a second conduit means connecting the exhaust conduit of the second system with a liquid supply source of the first system, control means in said first conduit to limit flow of fluid under pressure from the outlet of the heat exchange device of said first system into the supply conduit of the second system for circulation through said brake means and return through the second conduit to the fluid supply source of the first system, valve means responsive to the temperature of the fluid exhausting from the exhaust conduit of the second system and returning to the supply source of the first system and actuated by a temperature rise of the said exhausted fluid to open conduit means between the pump means of the first system and the supply conduit of the second system for delivery of an increased volume of fluid from the fluid supply source of the first system into the supply conduit of the second system.

14. In a system for liquid cooling of friction brakes on a motor vehicle, the combination of, friction wheel brake means arranged for circulation of cooling fluid through the brake means, a hydrokinetic torque transfer mechanism for effecting transfer of driving energy from the engine of a vehicle to the drive wheels and including a fluid circulatory system providing circulation of liquid through said mechanism including pump means effecting liquid circulation in the system and a heat exchange device through which a circulating liquid is directed for cooling, second pump means in the brake means and drivingly actuated concurrently with actuation of the brake means to effect circulation of cooling fluid through the brake means during actuation thereof, a heat exchange device, means providing a circulatory system between the second pump and brake means and last mentioned heat exchange device, conduit means connecting the outlet of the first mentioned heat exchange device of the first system with the supply conduit of the second system for delivery of fluid under pressure from the first system into the second system, a second conduit means connecting the exhaust conduit of the second system with a liquid supply source of the first system, control means in said first conduit to limit flow of fluid under pressure from the outlet of the heat exchange device of said first system into the supply conduit of the second system for circulation through said brake means and return through the second conduit to the fluid supply source of the first system, valve means responsive to the temperature of the fluid exhausting from the exhaust conduit of the second system and returning to the supply source of the first system and actuated by a temperature rise of the said exhausted fluid to open conduit means between the pump means of the first system and the supply conduit of the second system for delivery of an increased volume of fluid from the fluid supply source of the first system into the supply conduit of the second system, and valve means actuated concurrently with said temperature responsive valve to open a by-pass passage around said pump means in said brake means.

References Cited in the file of this patent

UNITED STATES PATENTS

| | | |
|---|---|---|
| 2,152,489 | Lamb | Mar. 28, 1939 |
| 2,363,977 | Kucher | Nov. 28, 1944 |
| 2,712,876 | Kuehn | July 12, 1955 |

FOREIGN PATENTS

| | | |
|---|---|---|
| 711,059 | Great Britain | June 23, 1954 |